United States Patent
Wu et al.

(10) Patent No.: US 9,250,377 B2
(45) Date of Patent: Feb. 2, 2016

(54) LIGHT GUIDE PLATE AND BACKLIGHT MODULE AND DISPLAY MODULE USING THE SAME

(71) Applicant: AU Optronics Corporation, Hsin-Chu (TW)

(72) Inventors: Chia-Hao Wu, Hsin-Chu (TW); Han-Ping Kuo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 166 days.

(21) Appl. No.: 14/033,549

(22) Filed: Sep. 23, 2013

(65) Prior Publication Data
US 2014/0111975 A1 Apr. 24, 2014

(30) Foreign Application Priority Data
Oct. 19, 2012 (TW) .............................. 101138715 A

(51) Int. Cl.
*F21V 7/04* (2006.01)
*F21V 8/00* (2006.01)
*G02F 1/1333* (2006.01)

(52) U.S. Cl.
CPC ............ *G02B 6/0045* (2013.01); *G02B 6/0088* (2013.01); *G02B 6/0055* (2013.01); *G02F 2001/133317* (2013.01)

(58) Field of Classification Search
CPC ................... G02F 1/133308; G02F 1/133608; G02F 1/133615
USPC ......................................... 362/615, 616, 628
See application file for complete search history.

(56) References Cited

U.S. PATENT DOCUMENTS

| | | | |
|---|---|---|---|
| 5,711,592 A * | 1/1998 | Hotta | 362/496 |
| 6,426,763 B1 * | 7/2002 | Sagawa | 346/65 |
| 7,973,876 B2 | 7/2011 | Fu et al. | |
| 2008/0291356 A1 * | 11/2008 | Kim | G02F 1/133615 349/58 |

(Continued)

FOREIGN PATENT DOCUMENTS

| | | |
|---|---|---|
| CN | 102354014 A | 2/2012 |
| CN | 202394007 U | 8/2012 |

(Continued)

OTHER PUBLICATIONS

English translation of abstract of CN 102354014 A (published Feb. 15, 2012).

(Continued)

*Primary Examiner* — Peggy Neils
*Assistant Examiner* — Alexander Garlen
(74) *Attorney, Agent, or Firm* — McClure, Qualey & Rodack, LLP

(57) ABSTRACT

A light guide plate includes a plate body and a supporting unit. The plate body has a light-exiting face and a lateral side, wherein the supporting unit is disposed along the lateral side. The supporting unit has a top surface and an outer lateral surface, the top surface is above the light-exiting face, the lateral surface protrudes from an end surface of the lateral side of the plate body, wherein a portion of the end surface away from the light-exiting face is exposed to form a recess. A backlight module includes the light guide plate mentioned above and a back plate having the light guide plate disposed thereon. A periphery of the back plate has a side wall formed thereon and extending into the recess. A display device includes the above light guide plate and a display panel.

13 Claims, 8 Drawing Sheets

(56) References Cited

U.S. PATENT DOCUMENTS

2009/0273732 A1* 11/2009 Shimura et al. ............... 349/65
2010/0246163 A1* 9/2010 Chen et al. .................. 362/97.1
2013/0107157 A1 5/2013 Yang et al.

FOREIGN PATENT DOCUMENTS

| CN | 102721011 A | 10/2012 |
|---|---|---|
| TW | I262279 | 9/2006 |
| TW | M311906 | 5/2007 |
| TW | 201035630 | 10/2010 |

OTHER PUBLICATIONS

China Office Action dated Aug. 1, 2014.
English translation of abstract of CN 102721011 A (published Oct. 10, 2012).
China Office Action dated Dec. 26, 2013.
China Office Action dated Jun. 4, 2015.

* cited by examiner

US 9,250,377 B2

LIGHT GUIDE PLATE AND BACKLIGHT MODULE AND DISPLAY MODULE USING THE SAME

BACKGROUND OF THE INVENTION

1. Field of the Invention

The present invention generally relates to a design of light guide plate. Particularly, the present invention relates to a light guide plate having a supporting unit.

2. Description of the Prior Art

Liquid crystal display devices have been extensively applied to various electrical products including computer, television, and communication devices. In general, the liquid crystal display device has a backlight module as a light source. The backlight module includes a light guide plate, which has functions of guiding light, improving luminance of the backlight module, and controlling brightness uniformity. On the other hand, the display device is becoming smaller, thinner, and/or lighter due to technology improvement and life demand. As a result, inner components of the display device or other electronic products having display function may be required to have the same or even better performance under a limited volume thereof or a limited space in the device.

As the display device 9a shown in FIG. 1A, which uses a backlight module including a conventional light guide plate 6a, a plastic frame 4, and a back plate 5a, wherein the plastic frame 4 has a function of supporting a display panel 8. The display device 9b shown in FIG. 1B, however, uses a backlight module without a plastic frame but a light guide plate 6b incorporated with a supporting rib 3 for supporting the display panel to achieve the function provided by the plastic frame. As a result, the backlight module shown in FIG. 1B, on one hand, has a simplified structure and, on the other hand, creates more space for some components such as the light guide plate. However, when it comes to slim border design for display device, there may still be large-angle light leakage resulted from a narrower light-blocking area 82 due to the slim border design and the lack of a light-shielding tape 7.

SUMMARY OF THE INVENTION

It is an object of the present invention to provide a light guide plate, which substitutes the use of the conventional plastic frame and meets the requirements of slim border design for display device.

It is another object of the present invention to provide a light guide plate, which allows greater-sized optical film(s) to be disposed thereon.

It is another object of the present invention to provide a light guide plate, a backlight module and a display device using the same, improving light leakage in slim border display device and satisfying optical quality for larger view angle.

The light guide plate of the present invention includes a plate body and a supporting unit. The plate body has a light-exiting face and a lateral side, wherein the supporting unit is disposed along the lateral side. The supporting unit has a top surface and an outer side surface, wherein the top surface is above the light-exiting face; the outer side surface protrudes from an end surface of the lateral side of the plate body and exposes a portion of the end surface away from the light-exiting face to form a recess.

The backlight module of the present invention includes the above-described light guide plate and a back plate, wherein the light guide plate is disposed on the back plate. A periphery of the back plate has a side wall formed thereon and extending into the recess.

The display device of the present invention includes the above-described light guide plate and a display panel, wherein the display panel is disposed on the light guide plate and supported by the top surface.

DETAILED DESCRIPTION OF THE PREFERRED EMBODIMENT

The light guide plate of the present invention is preferably used in a liquid crystal display device, but may also be used in other electronic devices adopting backlight module as a light source.

Figure 2A:
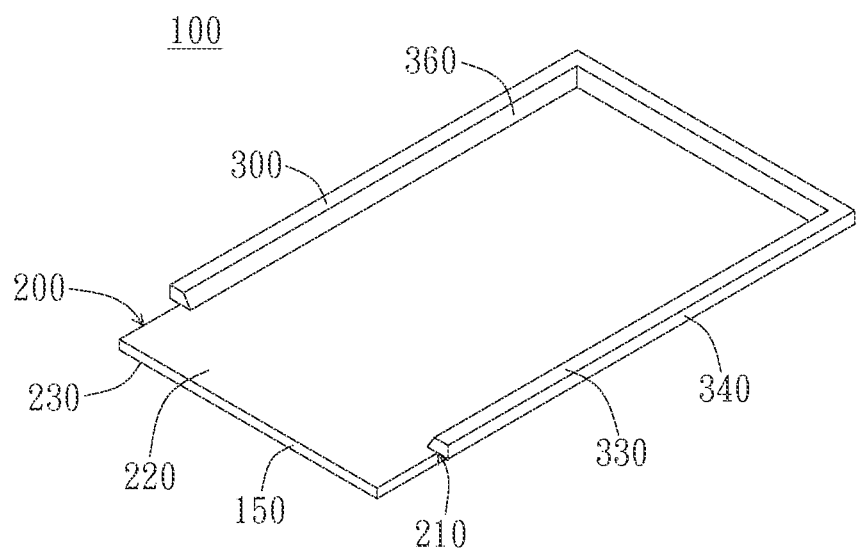
FIG. 2A is a three-dimensional view of an embodiment of the light guide plate of the present invention.
Figure 2B:
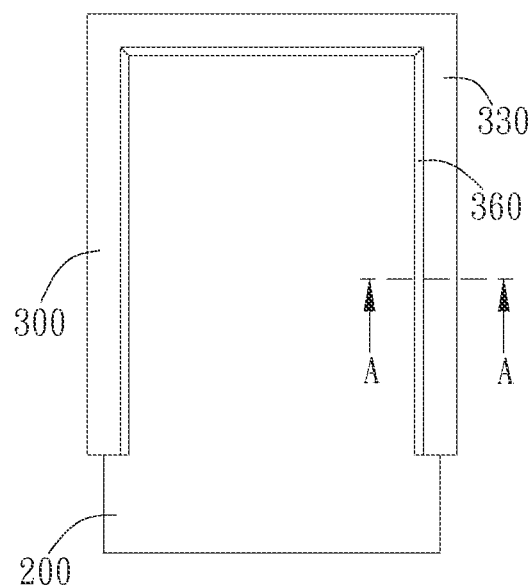
FIG. 2B is a top view of the embodiment shown in FIG. 2B.
Figure 2C:
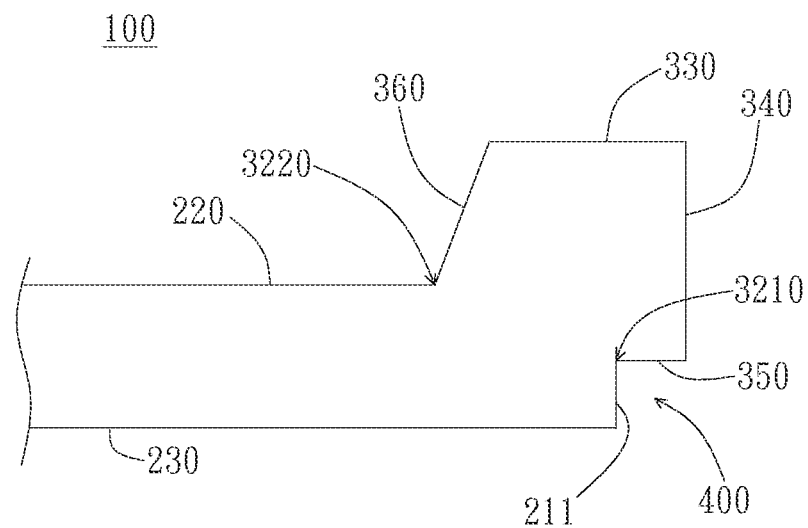
FIGS. 2C-2D are cross-sectional views of the embodiment shown in FIGS. 2A-2B along the A-A cross-sectional line.
Figure 2D:
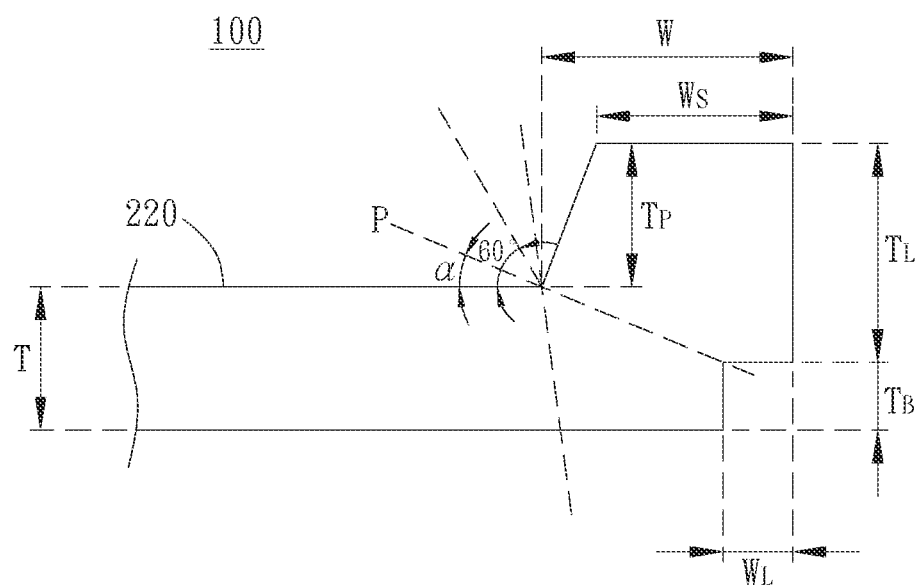
Figure 2E:
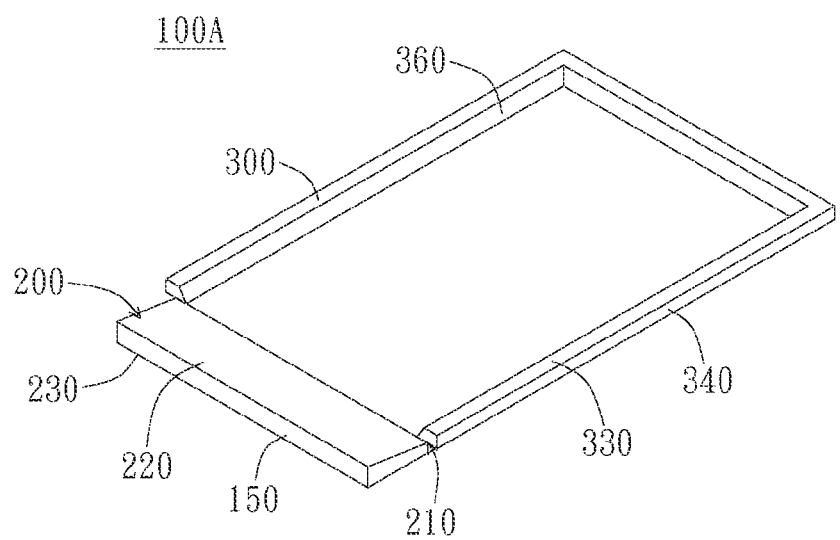
FIG. 2E is a three-dimensional view of another embodiment of the light guide plate of the present invention.

As the embodiment of the light guide plate of the present invention shown in FIGS. 2A-2B, the light guide plate 100 includes a plate body 200 and a supporting unit 300. The plate body 200 has a bottom 230, a light-exiting face 220, and a lateral side 210, wherein the supporting unit 300 is disposed along the lateral side 210. Since the light guide plate 100 of the present invention is formed in integral form, it may be said that the supporting unit 300 is formed at the lateral side 210 of the plate body 200. In the preferred embodiment of the present invention, the light-exiting face 220 of the plate body 200 is parallel to the bottom 230. In other embodiments, however, as FIG. 2E shows, all portions or a portion of the light guide plate 100A could be formed in wedge shape, wherein a portion of the light-exiting face inclines relative to the bottom.

In view of the light guide plate 100 of the present invention, which is generally a rectangular solid, the supporting unit is preferably distributed along at least two lateral sides of the plate body, such as opposite lateral sides of the plate body, but not limited thereto. In other embodiments, the supporting unit may be disposed/formed at one lateral side. As shown in FIGS. 2A-2B, the supporting unit 300 is disposed along three lateral sides of the plate body 200, wherein the lateral side without the supporting unit 300 is preferably the side at which the light-entering end 150 of the light guide plate 100 is located. Alternative to the supporting unit 300 being continuously distributed along three lateral sides of the plate body 200 and having a "U" shape as shown in FIGS. 2A-2B, in other embodiments of the present invention, a plurality of supporting units can be spaced at intervals and distributed along the lateral side of the plate body. For example, a plurality of supporting units in rectangular shape or any other proper shape can be disposed along the lateral side of the plate body. In addition, the interval(s) may allow the ear portion of film(s) or the back plate to be inserted thereinto.

Particularly, the supporting unit 300 has a top surface 330 and an outer side surface 340, wherein the top surface 330 is preferably at least partially parallel to an extending direction of the plate body 200, i.e. parallel to the light-exiting face 220, in order to facilitate the disposition of other components, such as a display panel. As FIGS. 2A and 2C-2D show, the top surface 330 of the supporting unit 300 is above the light-exiting face 220; the outer side surface 340 protrudes from an end surface 211 of the lateral side 210 of the plate body 200 and exposes a portion of the end surface 211 that is away from the light-exiting face 220. In other words, the supporting unit 300 approximately covers an edge located between the light-exiting face 220 and the lateral side 210 as well as a portion of the end surface 211 near the light-exiting face 220.

As described above, since the top surface 330 of the supporting unit 300 is above the light-exiting face, and the outer side surface 340 protrudes from an end surface 211 of the lateral side 210 of the plate body 200 and exposes a portion of the end surface 211, the supporting unit 300 has a height $T_p$ from the light-exiting face 220 and a length $W_L$ protruding from the end surface 211; the exposed portion of the end surface 211 has a height $T_B$ in the direction of thickness of the plate body 200 (or in the same direction as the height $T_p$). In addition, in the preferred embodiment of the present invention, the end surface 211 and the light-exiting face 220 of the plate body 200 are orthogonal. The outer side surface 340 is preferably parallel to the end surface 211, and the extending length WL can be considered as a vertical distance between the outer side surface 340 and the end surface 211.

Furthermore, the supporting unit 300 has a bottom surface 350 opposite to the top surface 330. The bottom surface 350 is connected to the outer side surface 340 of the supporting unit 300 and the exposed portion of the end surface 211, respectively. The bottom surface 350 and the exposed portion of the end surface 211 connect at a first boundary 3210. That is, a recess 400 is formed between the exposed portion of the end surface 211 and the supporting unit 300. Moreover, the supporting unit 300 has an inner side surface 360 opposite to the outer side surface 340, wherein the inner side surface 360 and the light-exiting face 220 connect at a second boundary 3220. In the preferred embodiment of the present invention, a largest width W of the supporting unit 300 in the direction parallel to the light-exiting face 220 is preferably equal to a vertical distance between the second boundary 3220 and the outer side surface 340. In other words, a width $W_S$ of the top surface 330 in the same direction is preferably less than or equal to the width W, but is not limited thereto. Since the light guide plate 100 of the present invention is preferably formed in integral form by a molding process and then demolded, wherein the demolding process utilizes an ejector pin to push the light guide plate 100 out of the mold though the top surface 330 of the supporting unit 300. Therefore, the width $W_S$ of the top surface 330 is preferably greater than or equal to the size of the ejector pin. For example, a diameter of a cross-section of the ejector pin could be 0.4 mm, the width $W_s$ is therefore not less than 0.4 mm, i.e. equal to or greater than 0.4 mm; however, it is not limited to the embodiment of the present invention.

Shape and size of the recess 400 and location of the first boundary 3210 are related to the distance $W_L$ between the outer side surface 340 and the end surface 211 as well as the height $T_B$ of the exposed portion of the end surface 211. Particularly, the larger the distance $W_L$ is, the closer the first boundary 3210 to the second boundary 3220 is. In the present invention, however, it is preferred that the first boundary 3210 does not cross the second boundary 3220 to be under the light-exiting face 220 (described later). The larger the height $T_B$ is, the closer the first boundary 3210 to the second boundary 3220 is, wherein the first boundary 3210 may exceed the second boundary 3220. As such, the light emitted from the first boundary 3210 will be harder to enter the visual area, preventing or improving the leakage of light. In addition, the distance $W_L$ and the height $T_B$ are preferably designed in accordance with the back plate of the backlight module using the light guide plate of the present invention, i.e. in accordance with a thickness of the back plate and a height of the side wall (described later).

However, even if the distance $W_L$ and the height $T_B$ can be adjusted, a proper distance is preferably maintained between the first boundary 3210 and the second boundary 3220, i.e. a proper thickness along the connecting line between the first boundary 3210 and the second boundary 3220, ensuring the strength of the structure. As a result, the distance $W_L$ by which the outer side surface 340 protrudes from the end surface 211 is preferably less than the width W of the supporting unit 300, and is more preferably less than the width $W_S$ of the top surface 330 in the same direction. The height $T_B$ of the exposed portion of the end surface 211 is preferably not larger than the thickness T of the plate body 200. In other words, it is preferably to maintain the location of the first boundary 3210 to be on one side of the second boundary 3220 close to the lateral side 210 and the bottom 230 of the plate body 200.

On the other hand, as FIGS. 2C-2D show, in the embodiment of the present invention, a virtual plane P (the dotted line represents an edge of the plane) is defined by the first boundary 3210 and the second boundary 3220 and forms an included angle α with the light-exiting face 220. Generally, in order to reduce the influence on visual quality by light leaking from the display device, the largest view angle of the second boundary 3220 with regard to the visual area is usually controlled to be not larger than 60 degrees (i.e. less than or equal to 60 degrees). That is, theoretically, when an angle of the light emitted from the second boundary 3220 with respect to the light-exiting face is less than or equal to 60 degrees, the light may enter the visual area of the display device. As a result, the angle α of the light guide plate of the present invention is preferably not larger than 60 degrees, i.e. less than or equal to 60 degrees. In this way, the largest view angle of the first boundary 3120 with regard to the visual area is also controlled to be less than or equal to 60 degrees. In the embodiment of the present invention, the angle a is not larger than 60 degrees and preferably less than or equal to 45 degrees.

As described above, the location of the first boundary 3210 is related to the distance $W_L$ and the height $T_B$. As a result, the distance $W_L$ and the height $T_B$ are preferably adjusted so that the virtual plane P defined by the first boundary 3210 and the second boundary 3220 forms an included angle not larger than 60 degrees and preferably not larger than 45 degrees with the light-exiting face 220. That is, the angle a is equal to or less than 60 degrees, and preferably equal to or less than 45 degrees.

FIG. 3 shows an embodiment of the backlight module of the present invention. The backlight module 10 includes the light guide plate 100 described above and a back plate 500, and preferably further includes optical film(s) 700 disposed on the light-exiting face 220 of the light guide plate 100. A periphery of the back plate 500 has a side wall 550 formed or disposed thereon. The light guide plate 100 and the optical film(s) 700 are disposed on the back plate 500. Furthermore, the side wall 550 has a height H. When the light guide plate 100 is disposed on the back plate 500, the side wall 550 may be received in the recess 400 and preferably support the bottom surface 350 of the supporting unit 300. The outer side surface 340 of the supporting unit 300 is preferably flushed with an outer surface of the side wall 550. That is, the outer side surface 340 of the supporting unit 300 and the outer surface of the side wall 550 are preferably coplanar. Since the side wall 550 is received in or engaged with the recess 400, the corresponding area or connecting area between the light guide plate 100 and the back plate 500 may increase, further increasing the structural stability.

As described above, the distance $W_L$ by which the outer side surface 340 of the light guide plate 100 protrudes from the end surface 211 and the height $T_B$ of the exposed portion of the end surface 211 are preferably designed in accordance with the back plate 500 of the backlight module, i.e. in accordance with a thickness $T_b$ of the back plate 500 and the height H of the side wall 550. In detail, the distance $W_L$ by which the outer side surface 340 protrudes from the end surface 211 is not less than (i.e. equal to or larger than) the thickness of the back plate 500, i.e. not less than the thickness of the side wall 550; the height $T_B$ of the exposed portion of the end surface 211 is preferably not larger than the height H of the side wall 550. For example, material of the back plate 500 may be a sheet metal part; an end of the sheet metal part may be bent to form the side wall 550. Generally, the height H of the side wall 550, which is formed by bending the sheet metal part, is at least the triple of a thickness of the sheet metal part to maintain the product quality, but not limited thereto. As a result, in the embodiment, when the height H of the side wall 550 is the smallest, the height $T_B$ of the exposed portion of the end surface 211 is at most equal to the triple of the thickness $T_b$ of the side wall 550.

Further speaking, a gap g may be formed between the end surface 211 and the side wall 550. The gap g may be resulted from assembling the backlight module 10, wherein the distance $W_L$ is preferably a sum of the gap g and the thickness $T_b$ of the side wall 550. In other embodiments, however, the gap g may be for filling glue or double-sided adhesive tape. In other embodiments, no gap is formed between the end surface 211 and the side wall 550. On the other hand, the backlight module 10 of the present invention may include a reflective sheet disposed under the bottom 230 of the light guide plate 100 and adhesive material which fixes the reflective sheet to the back plate 500. Meanwhile, the height $T_B$ of the exposed portion of the end surface 211 is designed to be less than the height H of the side wall 550, wherein a sum of the height $T_B$ and the total thickness of the reflective sheet and the adhesive material is substantially equal to the height H.

Figure 3A:
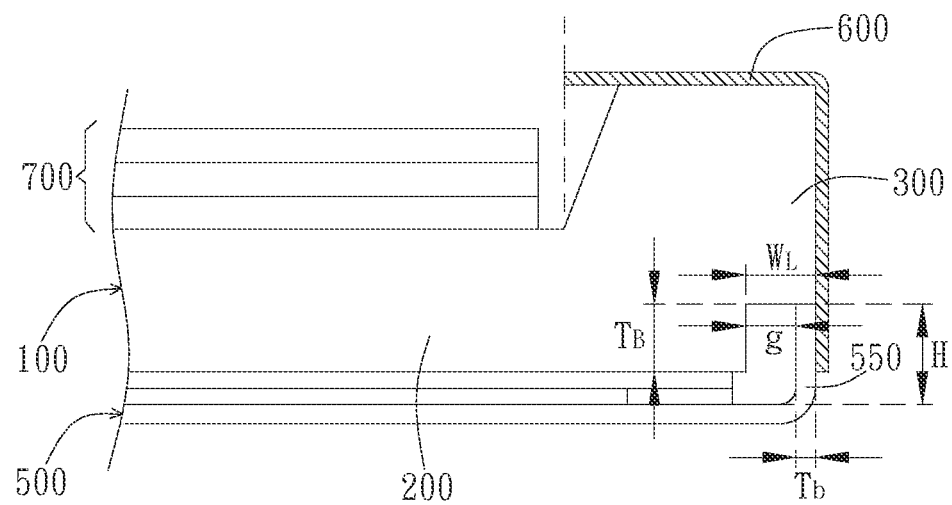
FIG. 3A is a cross-sectional view of an embodiment of the backlight module of the present invention.

As FIG. 3A shows, the backlight module 10 may further include a tape 600 attached to the outer surface of the side wall 550, the outer side surface 340 and the top surface 330 of the supporting unit 300. The tape 600 may protrude from the top surface 330 toward an interior of the backlight module 10, but preferably does not protrude to be above the optical film(s) 700 in order to prevent itself from extending into the visual area due to the tolerance of assembling of the display device. The tape 600 is not limited to any color and preferably has light absorption or reflection property. In addition to securing the light guide plate 100 and the back plate 500, the tape 600 is mainly for absorbing or reflecting the light emitted from the outer side surface 340 of the supporting unit 300; the light reflected by the tape 600 is reusable or recyclable. In the display device, the tape 600 also has a function of connecting the display panel and the backlight module 10.

Figure 1A:
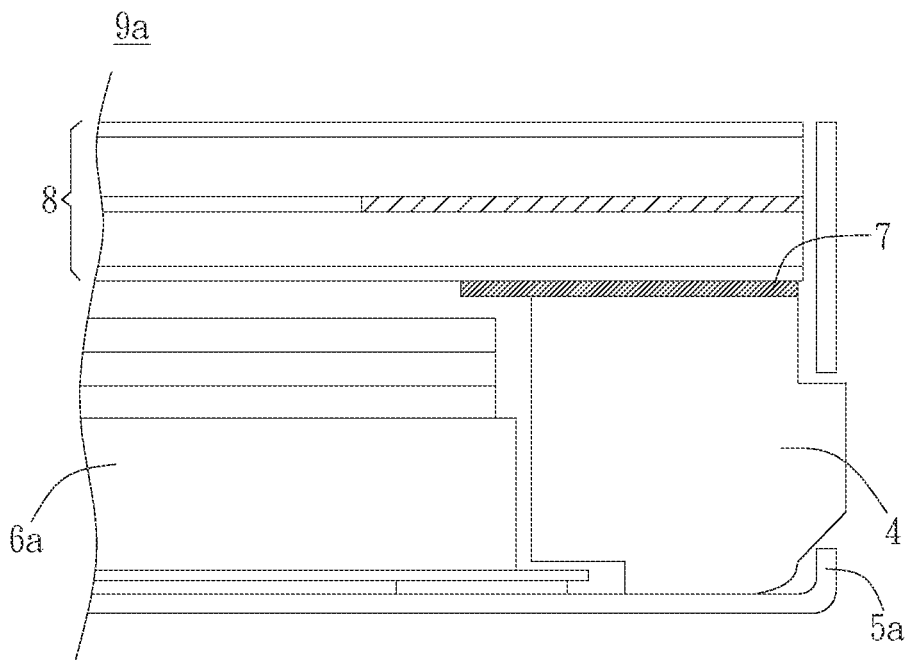
FIGS. 1A-1B show schematic views of the conventional display device.
Figure 1B:
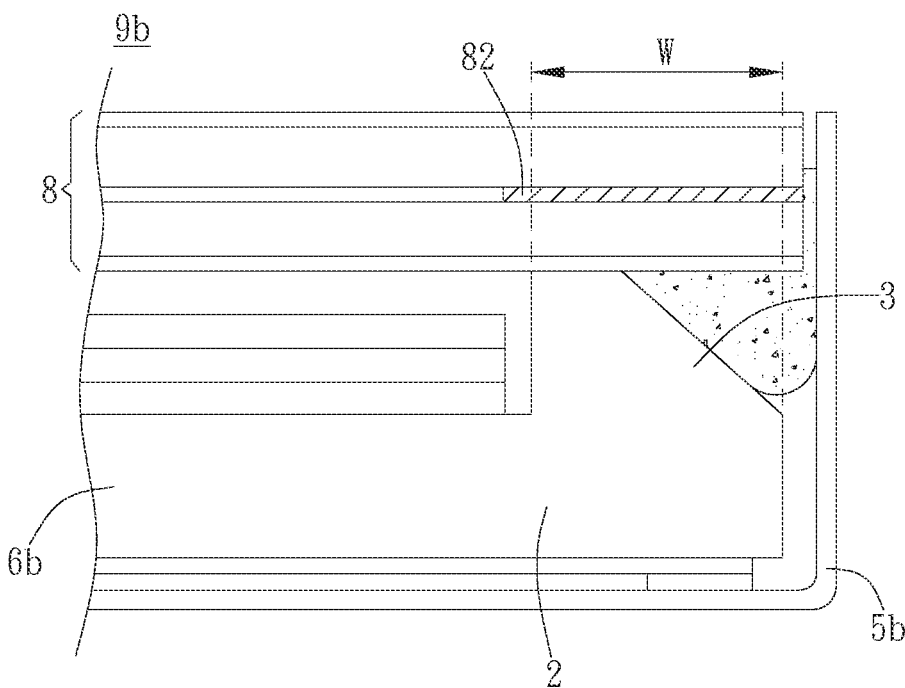
Figure 3B:
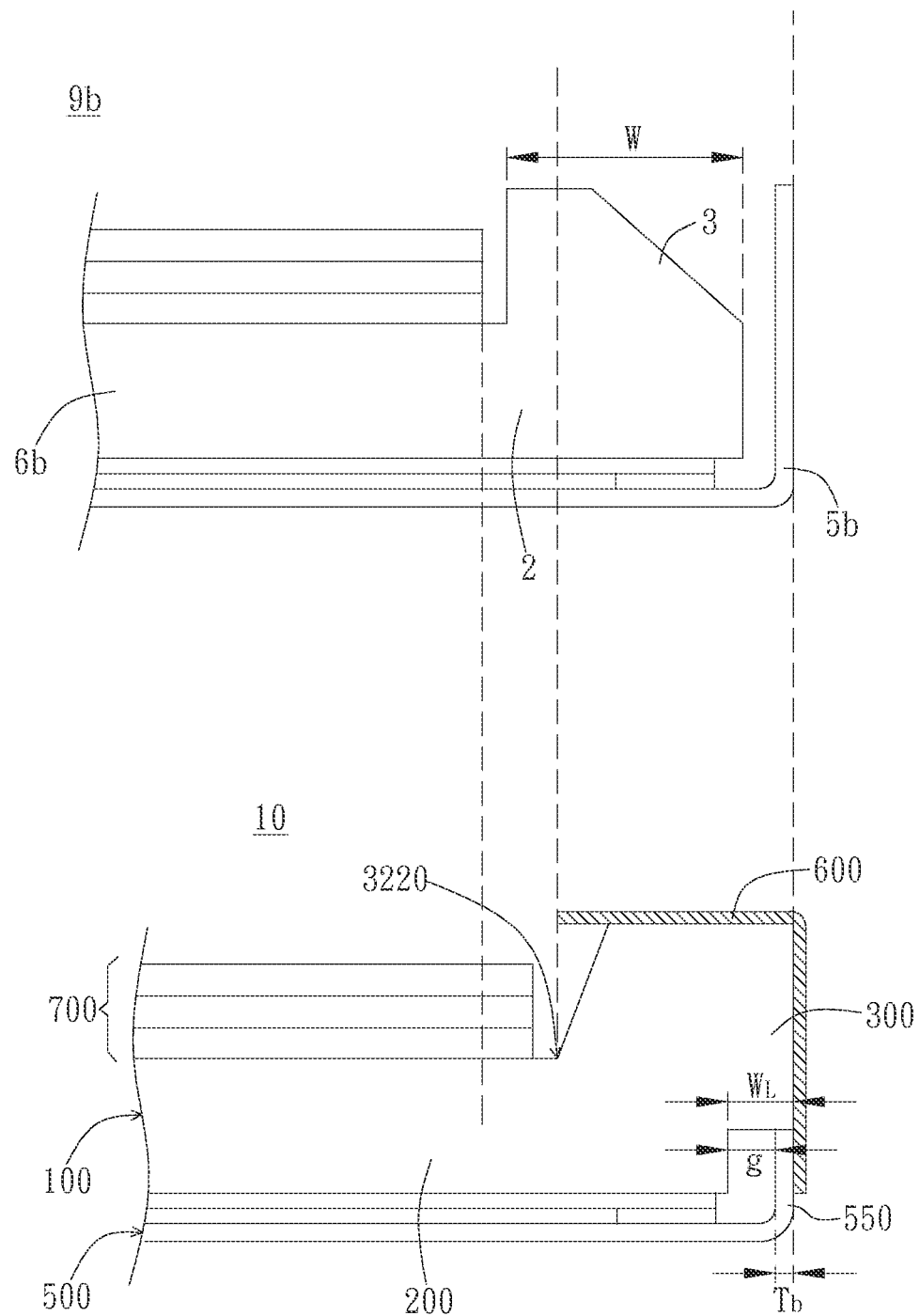
FIG. 3B shows a comparison between the embodiment shown in FIG. 3A and the backlight module of the conventional display device.

As FIG. 3B show, comparing the backlight module 10 of the present invention to the backlight module of the conventional display device 9b shown in FIG. 1B, the supporting rib 3 of the conventional backlight module is disposed on a side of the light guide plate 6b having the light-exiting face. On the condition that the width W of the supporting unit 300 and supporting rib 3 (i.e. the largest width W of the supporting unit 300/supporting rib 3 in a direction parallel to the light-exiting face) is maintained the same, the supporting unit 300 of the present invention is displaced outward to be positioned above the side wall 550 without affecting the overall outline of the backlight module. In addition, as shown in FIG. 3B, the second boundary 3220 of the present invention in the display device will be much farther away from the visual area, therefore avoiding the occurrence of large-angle light leakage. On the other hand, the configuration of the present invention allows the use of light guide plate 100 having larger volume; the space for disposing the optical film(s) 700 also increases, which enhances light-use efficiency.

Figure 4A:
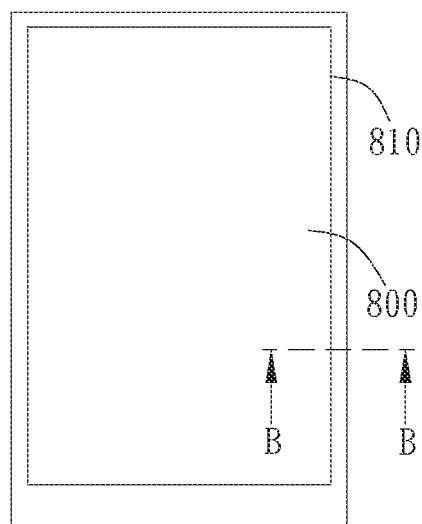
FIG. 4A is a top view of an embodiment of the display device of the present invention.
Figure 4B:
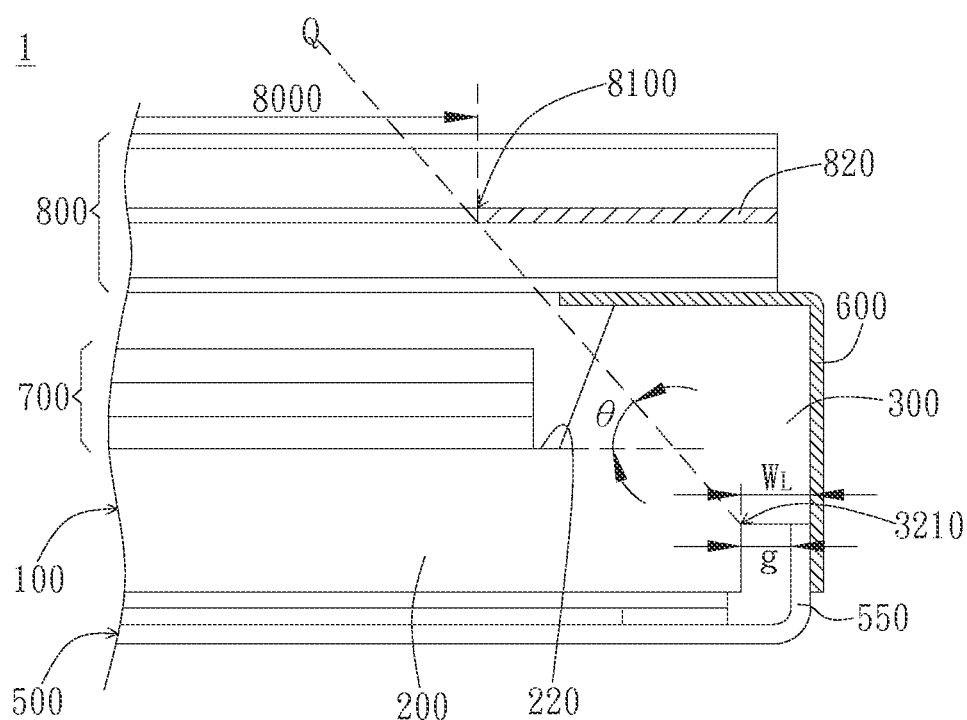
FIG. 4B shows a cross-sectional view of the embodiment shown in FIG. 4A along the B-B cross-sectional line.
Figure 5:
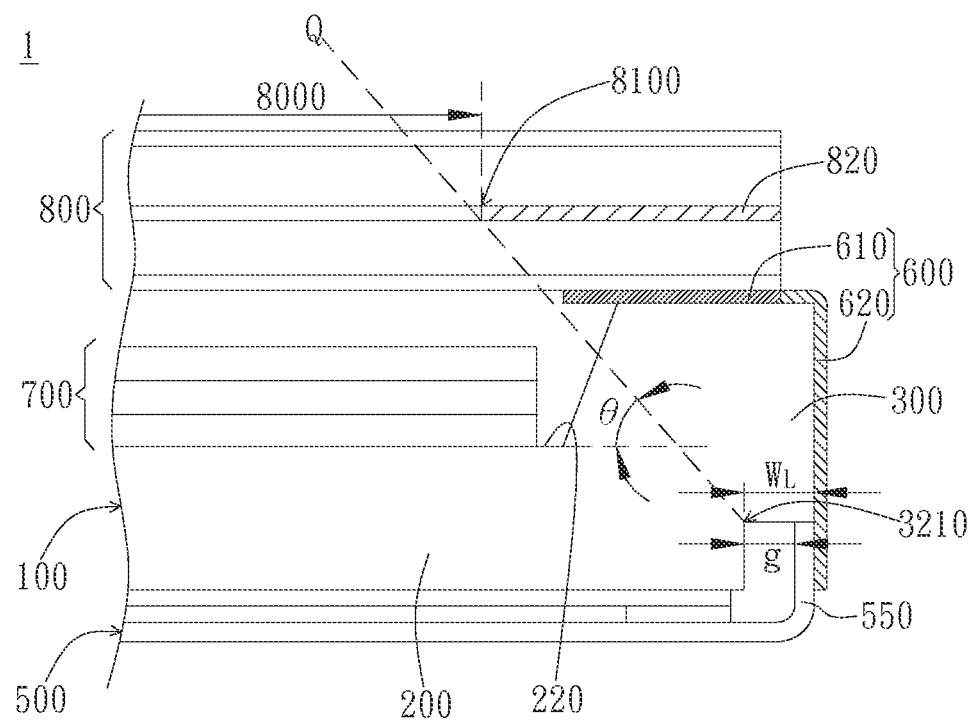
FIG. 5 is a cross-sectional view of another embodiment of the display device of the present invention.

FIGS. 4A-4B show an embodiment of the display device of the present invention. The display device 1 includes the above-described light guide plate 100 and the display panel 800, and preferably includes the above-described backlight module 10 and the display panel 800. In addition, as FIG. 5 shows, the above-described tape 600 preferably includes a first portion 610 and a second portion 620, wherein the first portion 610 is substantially attached to the top surface 330 and is preferably also adhesive on the side opposite to top surface 330 for adhering the display panel 800. For example, the first portion 610 of the tape 600 is a double-sided adhesive tape; the second portion 620 is a single-sided adhesive tape. In other embodiments, a plurality of tapes such as one single-sided adhesive tape and one double-sided adhesive tape could be applied and be attached to the outer side surface 340 and the top surface 330, respectively. Alternatively, the doubled-sided tape may overlap a portion of the single-sided adhesive tape on the top surface 330. Color or thickness of the plurality of tapes could be various.

The display panel 800 may have the visual area 8000 and a border of visual area 8100, wherein the border of visual area 8100 could be defined as an edge of the light-blocking area 820 facing the interior of the display panel 800. As FIG. 4B shows, a virtual plane Q (the dotted line represents an edge of the plane) defined by the border of visual area 8100 and the first boundary 3210 forms an included angle θ with the light-exiting face 220. In the embodiment of the present invention, the included angle θ is preferably not larger than 60 degrees (i.e. equal to or less than 60 degrees) and more preferably not larger than 45 degrees (i.e. equal to or less than 45 degrees). As a result, the influence on visual quality by light leaking from the display device can be improved in the display device 1 of the present invention; the display device 1 also satisfies optical quality regarding larger view angle.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A light guide plate, comprising:
a plate body having a light-exiting face and a lateral side;
a supporting unit disposed along the lateral side;

wherein the supporting unit has a top surface, a bottom surface opposite to the top surface, an outer side surface and an inner side surface opposite to the outer side surface, the top surface is above the light-exiting face, the outer side surface protrudes from an end surface of the lateral side and exposes a portion of the end surface away from the light-exiting face to form a recess opposite to a side of the plate body having the light-exiting face;

wherein the bottom surface and the exposed portion of the end surface connect at a first boundary, the inner side surface and the light-exiting face connect at a second boundary, a virtual plane defined by the first boundary and the second boundary forms an included angle, the included angle equal to or less than 60 degrees with the light-exiting face.

2. The light guide plate of claim 1, wherein the outer side surface protrudes from the end surface by a distance, the distance is less than a width of the top surface in the same direction.

3. The light guide plate of claim 2, wherein the width is equal to or larger than 0.4mm.

4. The light guide plate of claim 1, wherein a height of the exposed portion of the end surface is equal to or less than a thickness of the plate body.

5. The light guide plate of claim 1, wherein the included angle is equal to or less than 45 degrees.

6. The light guide plate of claim 1, wherein the supporting unit covers an edge located between the light-exiting face and the lateral side.

7. A backlight module, including:
a light guide plate of claim 1; and
a back plate having an end bent to form a side wall, wherein the light guide plate is disposed on the back plate, the side wall extends into the recess.

8. The backlight module of claim 7, wherein a height of the exposed portion of the end surface is equal to or smaller than a height of the side wall.

9. The backlight module of claim 8, wherein the height of the side wall is greater than or equal to triple a thickness of the back plate.

10. The backlight module of claim 7, wherein a distance by which the outer side surface protrudes from the end surface is equal to or larger than a thickness of the back plate.

11. The backlight module of claim 7, wherein the supporting unit has a bottom surface opposite to the top surface, the side wall supports the bottom surface.

12. A display device, comprising:
a light guide plate of claim 1; and
a display panel disposed on the light guide plate and supported by the top surface.

13. The display device of claim 12, wherein the included angel is equal to or less than 45 degrees.

* * * * *